United States Patent Office 3,434,857
Patented Mar. 25, 1969

3,434,857
METHOD OF PRODUCING LEAD CHROMATES
Fritz Seelig, Cologne-Holweide, Germany, assignor to Farbwerke Franz Rasquin GmbH, Cologne-Mulheim, Germany
No Drawing. Filed Apr. 26, 1966, Ser. No. 545,275
Int. Cl. C09c 1/62, 1/20
U.S. Cl. 106—298     3 Claims

ABSTRACT OF THE DISCLOSURE

A method of producing lead chromate pigments of excellent color fastness and weather stability by means of the synergistic effect associated with the addition of an alkali water glass and antimony and fluorine ions to a suspension of lead chromate which has been washed so as to be free of salt, the total amount of additives comprising approximately 4 to 8% based on the dry lead chromate pigment.

---

The present invention relates to a method of producing lead chromates which have a very high color fastness and weather stability.

Lead chromates have been employed for many years as pigments for paints, enamels and the like, and more recently also for coloring plastics especially because they are relatively inexpensive and possess excellent properties. However, their color fastness and weather stability has often been found inadequate.

Although in recent years many proposals have been made for improving the color fastness and weather stability of these materials, it has still not been possible to comply with the highest requirements. Among the most effective of these proposals are those which relate to the addition of different accessory agents during or after the precipitation of the lead chromate pigment.

According to the present invention the surprising discovery has now been made that a combination of different additives which are known individually for improving the color fastness and weather stability of lead chromates will produce a result which far exceeds the total of the individual effects which could possibly be expected.

Aside from this surprising synergetic effect, it has, however, been found that a further unexpected improvement of the lead chromate pigments will be attained if they are produced in accordance with the new method. This improvement consists in the fact that these lead chromate pigments possess a high degree of color purity which can be attained only if antimony trifluoride is employed as an additive in place of the other antimony compounds.

It has further been discovered that the individual components which are employed within the compound must be added at very particular points within the method or in a very particular order of succession in order to attain the desired extreme improvement of the color fastness and weather stability. This discovery is so novel and surprising especially because in some of the previous methods it was proposed that the particular improving agent be added at various points during the production.

As starting materials, the method according to the present invention employ lead chromates in a watery suspension. These lead chromates as such may be produced according to one of the conventional methods. Of course, the most suitable starting materials are lead chromates which originally possess a relatively good color fastness because of the manner of their production. Thus, for example, the best results insofar as the improvement in color fastness and weather stability is concerned will be attained if the starting materials are produced by a precipitation of lead nitrate solutions with chromates. A successive performance of the new method absolutely requires that before the improving agents are added, the suspension of the lead chromate is extensively freed of soluble salts by intensive washing.

The first step in the entire method of producing a product according to the invention consists in adding such an amount of a soluble alkali silicate or additives of the same effect which in the solution contain the ions of the alkali silicate that the pH value of the pigment suspension will be changed to a value of 9 to 10. A sodium silicate which can be employed is one having a general composition of $Na_2O_x3.5SiO_2$. The next step in the method concerns the addition of such an amount of antimony trifluoride to a watery solution of this material that the pH value of the suspension will reach the value of 4 to 5.

Of course, it is not absolutely necessary to start this method step with the antimony trifluoride in its finally prepared form, but the same effect may be attained if the addition consists of solutions of materials which, by a reaction with each other, contain the dissolved ions of the antimony trifluoride within the solution.

A lead chromate suspension which is treated in this manner may be easily filtered and dried without any additional treatment. Since the lead chromate pigments which are to be improved never possess any absolutely equal composition but one which varies because of the different manners of their production, it is impossible to state the absolutely precise amounts of the additives which are to be applied in accordance with the invention. However, any person familiar with the art will be readily able to adjust the lead chromate suspensions to the prescribed pH values by an addition of the agents which improve the color fastness and weather stability. The total amount of the additives should, however, not be less than approximately 4% in order to attain a really excellent color fastness and weather stability, while a total amount of additives in excess of 8% of the dry pigment, although possible, will not result in any further improvement.

In the following examples, all of the parts indicated are parts by weight.

EXAMPLE 1

This relates to the production of a reddish lead chromate which in the following examples is either further treated according to the inventive method or to which only the individual known components are added to illustrate the effect which is attained according to the invention.

450 parts of lead in the form of a lead nitrate solution are mixed with
12,000 parts of water and are heated to 45° C. Thereafter a solution is prepared of
324 parts of bichromate of sodium,
54 parts of sodium chloride,
221 parts of caustic soda of 45%, and
1,600 parts of water.

The pH value of this solution is adjusted to an amount of 10. The first half of this solution is then added by stirring within a period of 15 minutes to the lead solution. The resulting mixture is further stirred for ½ hour at 45° C., and thereafter the second half of the bichromate solution is added within a period of 15 minutes. After being stirred for 1 hour, the pH value of the total solution amounts to approximately 8.4. It is then allowed to mature overnight and is thereafter washed free of chromium by decanting.

A dried and ground specimen of this product was painted on a surface in a nitrocellulose or synthetic resin varnish and already showed a very strong darkening after being exposed to light in a fadeometer for only 15 hours.

EXAMPLE 1a

A lead chromate suspension which is produced in accordance with the Example 1 is mixed by stirring with one hundred eight parts of sodium silicate ($D=1.34$). The pH value then reaches an amount between 9 and 10. After stirring for ½ hour, 43 parts of antimony trifluoride are then added in a dry condition. The pH value then amounts to 4.0. This is further stirred for 10 minutes and then filtered and dried.

The product attained is a lead chromate of an excellent color fastness. After being painted on a surface within a nitrocellulose or synthetic resin varnish, it did not show any darkening even after 1,000 fadeometer hours.

EXAMPLE 1b

The lead chromate suspension which is produced in accordance with Example 1 is mixed by stirring only with 108 parts of sodium silicate ($D=1.34$). The pH value reaches an amount of 9.5. After stirring for ½ hour, the material is pressed out and dried.

After being painted on a surface within a nitrocellulose or synthetic resin varnish, the product already showed considerable darkening after 40 fadeometer hours.

EXAMPLE 1c

Forty-three parts of antimony trifluoride in a dry condition are strewn into the lead chromate suspension which is attained according to Example 1. The pH value attained amounts to 4 to 5. After being stirred for 10 minutes, the material is filtered and dried.

The product which is thus attained showed in a nitrocellulose or synthetic resin varnish a stronger darkening after no more than 360 hours than the product which is attained according to Example 1a in accordance with the present invention.

EXAMPLE 2

This example describes the production of a light lead chromate which is further treated in accordance with the invention as described in the subsequent examples.

| | |
|---|---|
| 450 | parts of lead in the form of a lead nitrate solution are mixed with |
| 12,000 | parts of water. To this solution are added within a period of 20 minutes: |
| 207 | parts of sodium bichromate in the form of a solution, |
| 49.5 | parts of sodium sulphate sicc., |
| 36 | parts of sodium chloride, |
| 121 | parts of caustic soda of 45%, and |
| 1,000 | parts of water. |

A suspension is then attained with a pH value of 3.8, which still contains free lead ions. By means of

| | |
|---|---|
| 7 | parts of soda which are dissolved in water at a ratio of 1:10, this suspension is adjusted to a pH value of 5 and stirred for 1 hour at 80° C. Thereafter |
| 108 | parts of sulphate of aluminum dissolved in water at a ratio of 1:5 are added. The pH value of the suspension then amounts to 3.9. A specimen then shows on lead a negative reaction. This is allowed to stand overnight and there- | after the excessive liquid is drawn off. The product is then washed three times with 26,000 parts of water by filling up and decanting and the final volume is adjusted to 12,000 parts.

A dried and ground specimen of this product was painted on a surface in a nitrocellulose or synthetic resin varnish and already showed a very strong darkening after being exposed to light in a fadeometer for no more than 15 hours.

EXAMPLE 2a

A lead chromate suspension which is produced in accordance with Example 2 is mixed by stirring with 108 parts of sodium silicate ($D=1.34$), the pH value then reaches an amount between 9 and 10. After stirring for ½ hour, 43 parts of antimony fluoride are added in a dry condition. The pH value attained amounts to 4.0. This is further stirred for 10 minutes and then filtered and dried.

When painted on a surface in a nitrocellulose or synthetic resin varnish, this lead chromate did not show any darkening even after 1,000 fadeometer hours. The product has therefore an excellent color fastness.

Although my invention has been described with reference to the preferred embodiments thereof, I wish to have it understood that it is in no way limited to the details of such embodiments but is capable of numerous modifications within the scope of the appended claims.

Having thus fully disclosed my invention, what I claim is:

1. A method of producing lead chromate pigments of an excellent color fastness and weather stability by means of additives having a synergistic effect of improving the color fastness and weather stability, which method comprises adding to a lead chromate suspension which has been washed so as to be free of salt an amount of alkali water glass so as to adjust the pH value of the suspension to 9 to 10, and then adding antimony trifluoride or compounds which in the suspension form antimony and fluorine ions in an amount to produce a pH value of the suspension of 4 to 5, and subsequently recovering the pigment from the suspension wherein the total amount of the additives amounts to approximately 4 to 8% based on the dry lead chromate pigment.

2. A method as defined in claim 1, wherein the alkali water glass comprises sodium silicate having a general composition of $Na_2O_x3.5SiO_2$.

3. The method of claim 1 wherein the antimony and fluorine ions are provided by the addition of antimony trifluoride.

References Cited

UNITED STATES PATENTS

| 2,212,917 | 8/1940 | Horning | 106—298 |
| 2,296,639 | 9/1942 | Hanahan. | |
| 2,316,244 | 4/1943 | Huckle et al. | 106—298 |

JAMES E. POER, *Primary Examiner.*

U.S. Cl. X.R.

106—303, 308